United States Patent
Prasad et al.

(10) Patent No.: US 8,683,494 B1
(45) Date of Patent: Mar. 25, 2014

(54) CONSTRUCTING EVENT SEQUENCES IN EVENT-DRIVEN PROGRAMS

(71) Applicant: Fujitsu Limited, Kawasaki (JP)

(72) Inventors: Mukul R. Prasad, San Jose, CA (US); Casper S. Jensen, Hinnerup (DK)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/665,452

(22) Filed: Oct. 31, 2012

(51) Int. Cl.
*G06F 13/00* (2006.01)

(52) U.S. Cl.
USPC .......................................................... 719/318

(58) Field of Classification Search
USPC .......................................................... 719/318
See application file for complete search history.

(56) References Cited

U.S. PATENT DOCUMENTS 7,065,765 B2 * 6/2006 Cadden et al. ................. 718/102
8,539,512 B2 * 9/2013 Czymontek et al. .......... 719/318

OTHER PUBLICATIONS

Nariman Mirzaei, Sam Malek, Corina S. Păsăreanu, Naeem Esfahani, and Riyadh Mahmood. "Testing Android Apps Through Symbolic Execution". The Java Pathfinder Workshop 2012 (JPF 2012), Cary, North Carolina, USA, Retrieved Oct. 31, 2012.

S. Anand, M. Naik, H. Yang, M. J. Harrold, Automated Concolic Testing of Smartphone Apps, in: Proceedings of the 20th International Symposium on the Foundations of Software Engineering, FSE-20, Retrieved Oct. 31, 2012.

K.-K. Ma, K. Y. Phang, J. S. Foster, M. Hicks, Directed symbolic execution, in: Proceedings of the 18th international conference on Static analysis, Proceedings of SAS 2011 Conference, pp. 95-111, Oct. 24, 2011.

U.S. Appl. No. 13/587,920 dated Aug. 16, 2012.

* cited by examiner

*Primary Examiner* — Andy Ho
(74) *Attorney, Agent, or Firm* — Maschoff Brennan (57) ABSTRACT

A method of constructing a target event handler sequence from an end target in an event-driven program may include determining a variable to be read in a first event handler of multiple event handlers in the event-driven program. Each of the event handlers may include portions of code within the event-driven program. The method may also include determining a condition in the first event handler that is associated with the variable and determining multiple second event handlers of the event handlers that are configured to write to the variable. The method may also include pruning the second event handlers based on which of the second event handlers are configured to write a value to the variable that satisfies the condition.

20 Claims, 8 Drawing Sheets

```
public void refreshBillAmount()
{
    float excludeTaxRate = Settings.getExcludeTaxRate(getBaseContext());
    boolean enableExcludeTaxRate = Settings.getEnableExcludeTaxRate(getBaseContext());
    if(enableExcludeTaxRate == false)
        excludeTaxRate = 0;
    if(excludeTaxRate == 0)
    {
        appState.service.refreshBillAmount();
        appState.service.calculateTip(appState.service.getTipPercentageAsDouble()/100.0)
    } else
        calculateTip(tipPercent);
}
```

452 — `excludeTaxRate = 0;`
454 — `if(excludeTaxRate == 0)`
456 — `calculateTip(tipPercent);`

CONSTRUCTING EVENT SEQUENCES IN EVENT-DRIVEN PROGRAMS

FIELD

The embodiments discussed herein are related to constructing event sequences in event-driven programs.

BACKGROUND

Event-driven programs, i.e. a program in which the flow of the program is determined by events, are becoming increasingly more common. Event-driven programs are commonly used in user applications, such as in applications that provide graphical user interfaces (GUI). Additionally, event-driven programs may be used in mobile applications operating on mobile devices, such as smart phones and tablets, to provide users a GUI and other functionality. Using event-driven programs may ease use of mobile devices and other devices for users. However, event-driven programs used in mobile applications and in other applications also provide challenges in analyzing the behavior of these programs.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of constructing a target event handler sequence from an end target in an event-driven program may include determining a variable to be read in a first event handler of multiple event handlers in the event-driven program. Each of the event handlers may include portions of code within the event-driven program. The method may also include determining a condition in the first event handler that is associated with the variable and determining multiple second event handlers of the event handlers that are configured to write to the variable. The method may also include pruning the second event handlers based on which of the second event handlers are configured to write a value to the variable that satisfies the condition.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to methods and systems of constructing a target event handler sequence from an end target in an event-driven program. An event-driven program may be a program in which a flow of the program is determined by events. Some or all of the events accepted by the program may be serviced by portions of code in the event-driven program referred to as event handlers. In some event-driven programs, sequences of events that determine the flow of the event-driven program, and thus the flow of which event handlers are executed and the sequence they are executed in, may occur in varying combinations. As a result, constructing a target event handler sequence (i.e. a sequence of event handlers called during execution of an event-driven program) for a target event sequence that begins at the start of the event-driven program and ends by executing an end target may be difficult given the large number of possible target event handler sequences that may occur between the end target and the beginning of the event-driven program.

In some embodiments, a method of constructing a target event handler sequence may include identifying an end target in an event-driven program and a target event handler that includes the end target. The end target may be line of code, a branch statement, or some partial execution path in the event-driven program for which a target event handler sequence from a beginning of the event-driven program is to be constructed. The method may construct the target event handler sequence working from the target event handler back to the beginning of the event-driven program.

To construct the target event handler sequence, a variable to be read in the target event handler and a condition associated with the variable may be determined. This condition captures the constraints under which the execution of the target event-handler may follow a path that exercises the end target. Other event handlers within the event-driven program that are configured to write a value to the variable, referred to as computation event handlers, may also be determined. The computation event handlers may be pruned based on which of the computation event handlers are configured to write a value to the variable that satisfies the condition.

At least a part of the target event handler sequence may be constructed with the pruned computation event handlers and the target event handler by inserting navigation event handlers between the pruned computation event handlers and the target event handler. The navigation event handlers may be event handlers that do not write to the variable and that handle events that occur between executions of the computation event handlers, in accordance with the logic and user-interface of the event-driven program. Pruning the computation event handlers may reduce a number of partial target event handler sequences that may be explored and thus reduce a computing time and/or resources to construct a target event handler sequence.

After constructing the target event handler sequence, the target event sequence that corresponds to the target event handler sequence may be determined by mapping each event-handler in the target event handler sequence back to an event that it is meant to handle.

Embodiments of the present disclosure are explained with reference to the accompanying drawings.

Figure 1:
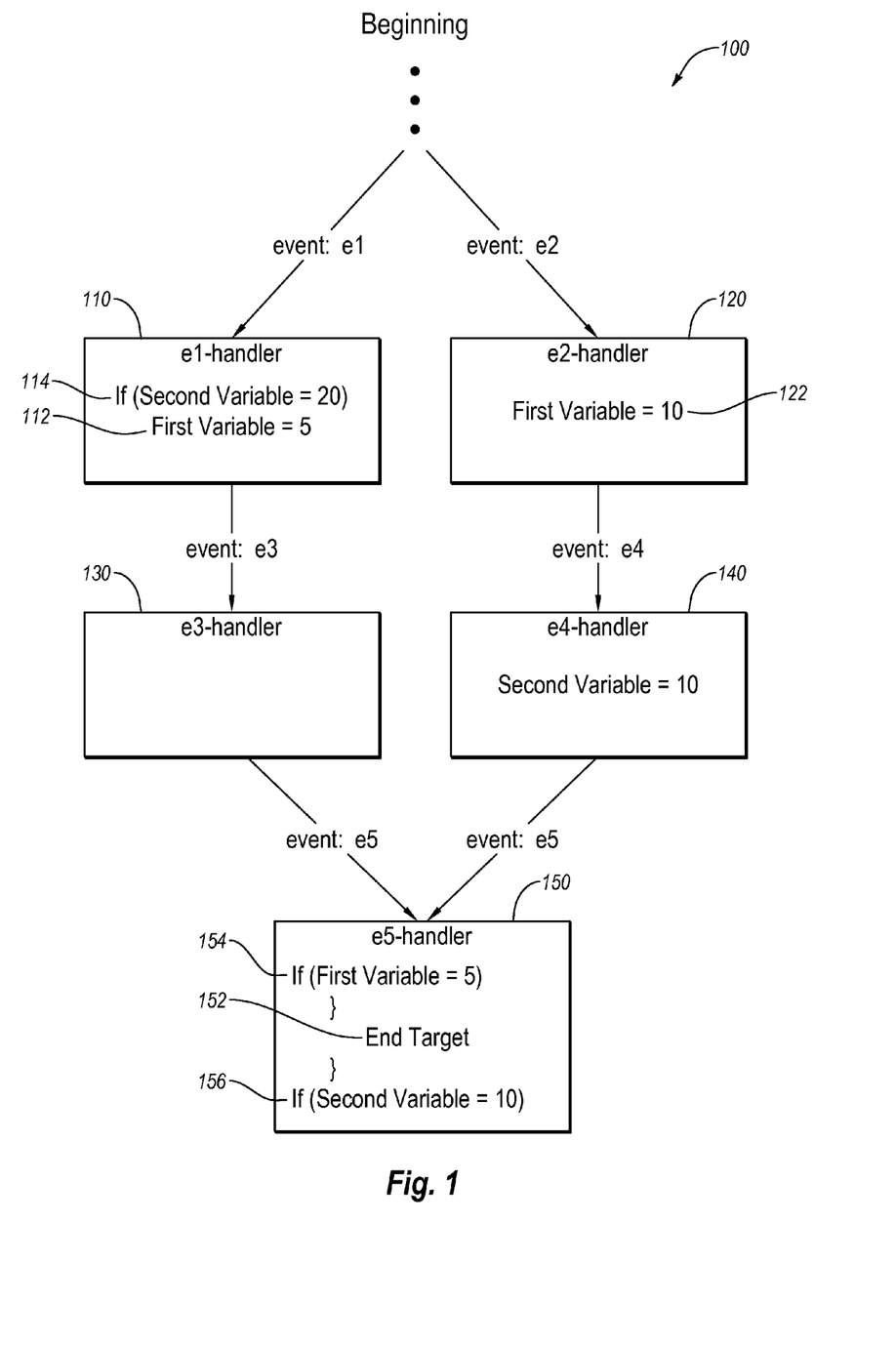
FIG. 1 illustrates an example event-driven program that includes multiple event handlers.

FIG. 1 illustrates an example event-driven program 100 that includes multiple event handlers, arranged in accordance with at least some embodiments described herein. The event-driven program 100 may be any program in which a flow of the program is determined by events. For example, the event-driven program 100 may be a program that provides a GUI for an operating system or some other application or program. Alternately or additionally, the event-driven program 100 may be an application for a device, such as a smart phone, a tablet computer, a touch screen computer, a desktop computer, a laptop computer, a navigation system, a vehicle control system, or some other type of device.

The event-driven program 100 may include code configured to handle multiple different types of events, such as events e1, e2, e3, e4, and e5. For each event, the event-driven program 100 may include an event handler. The event handler may include a portion of the code of the event-driven program 100 that may be configured to be executed or run when the corresponding event occurs. For example, for a touch screen controlled device running an event-driven program, an event may include selecting a back button; swiping to move to a different screen or move through a screen; user input that changes a configuration of the application, such as a user checking a box or inputting a value; user commands that cause the application to perform a function; among other events. For example, FIG. 1 illustrates various example event handlers 110, 120, 130, 140, and 150 of the event-driven program 100 for handling the events e1, e2, e3, e4, and e5. In particular, the e1 event handler 110 may handle the e1 event, the e2 event handler 120 may handle the e2 event, the e3 event handler 130 may handle the e3 event, the e4 event handler 140 may handle the e4 event, and the e5 event handler 150 may handle the e5 event. The event-driven program 100 may include other event handlers than just the event handlers 110, 120, 130, 140, and 150 that are illustrated.

Code within an event handler may include multiple different types of elements. Elements may include variables, among other types of elements. A variable may be a variable that is non-localized so that the variable may be accessed by multiple event handlers and a change to the variable by one event handler is carried through to other event handlers.

Various operations may be performed on the elements within an event handler. For example, an element, such as a variable may be read and/or written to in an event handler. For example, as illustrated in FIG. 1, in a code portion 112 of the e1 event handler 110, a first variable may be written to have a value of "5." As another example, in a code portion 154 of the e5 event handler 150, the first variable may be read to determine the value of the first variable.

Code within an event handler may also contain other operations and/or functions that may involve the different elements in the code within the event handler. For example, in the code portion 154 of the e5 event handler 150, an "if" statement may express a condition that is dependent on a value being read from the first variable. As another example, in the code portion 156 of the e5 event handler 150, an "if" statement may express a condition that is dependent on a value being read from a second variable.

Some portions of code within an event handler may be associated with a condition. A condition may express constraints on values of certain variables of the event-driven program under which a certain portion of code is executed during execution of the event-driven program 100. In some embodiments, a condition may be associated with a variable in the event-driven program 100. For example, as illustrated in FIG. 1, the code portion 154 may contain a conditional "if" statement that may contain a condition that may be satisfied when the first variable has a value of 5.

Code within an event handler may also contain a target. The target within an event handler may be a fragment of code within the event handler that is targeted for execution. A sequence of events that when exercised on the event-driven program 100 results in the execution of the target may be referred to as a target event sequence. A corresponding sequence of event handlers that are executed within the event-driven program 100 in response to the target event sequence may be referred to as a target event handler sequence. When an event handler contains a target, the event handler may be referred to as a target event handler.

A target may be a line of code, a branch statement, or some partial execution path, which may include one or more lines of code, one or more branch statements, and/or other operations and/or functions in the event-driven program 100. In some embodiments, a target may be an end target. In particular, when determining an ending location for a target event sequence and thus a target event handler sequence that begins at the beginning of the event-driven program 100, the target may be referred to as an end target. In some embodiments, a target may be associated with a condition in a target event handler. In these and other embodiments, the target may be executed in the target event handler when the condition is satisfied. For example, in FIG. 1, the end target 152 may be executed when the code portion 154 that contains the conditional "if" statement is satisfied.

In some embodiments, target event handler sequences that correspond with target event sequences may be constructed in the event-driven program 100 to assist in testing the functional correctness, reliability, or any other aspect of the event-driven program 100. For example, for each element or feature of an event-driven program 100 that may be tested, a target event handler sequence may be constructed to allow for concrete or symbolic testing of that element. Alternately or additionally, the event-driven program 100 may be tested using other testing procedures. For elements not covered by the other testing procedures, a target event handler sequence may be constructed to allow for concrete or symbolic testing of those elements.

When beginning to construct a target event handler sequence through the event-driven program 100, a target may be identified in the event-driven program 100. The initial target identified in the event-driven program 100 that is within a target event handler that is used as a beginning of the target event handler sequence may be referred to as an end target. In some embodiments, the end target may be randomly selected from a list of possible end targets within the event-driven program 100. In some embodiments, the end target may be identified based on a position of the end target within a list of possible end targets within the event-driven program 100. In some embodiments, the end target may be identified based on portions of the event-driven program 100 not tested by other test cases or other methods of testing the event-driven program 100. In some embodiments, the end target may be identified based on features of the event-driven program 100 that are particularly prone to having bugs. For example, an end target may be identified based on a suspected bug in the event-driven program 100 based on a static analysis of the event-driven program 100. As another example, an end target may be identified based on a portion of the event-driven program 100 not tested or covered by a regression test of the event-driven program 100.

After the end target is identified, a target event handler sequence from the target event handler, which includes the end target, to a beginning of the event-driven program 100 may be constructed. The construction of the target event handler sequence in the event-driven program 100 begins with the target event handler that contains the end target. During construction of the target event handler sequence, the target event handler is selected as a first event handler in the target event handler sequence and other event handlers in the event-driven program 100 are selected and pre-pended to the target event handler to bring the target event handler sequence back to the beginning of the event-driven program 100. Thus, the target event handler sequence is constructed by working backwards from the target event handler through various event handlers to the beginning of the event-driven program 100. Constructing the target event handler sequence may be performed in various stages as more and more event handlers are identified for completing the target event handler sequence. For example, the e5 event handler 150, which contains the end target 152, may be a target event handler for a target event handler sequence through the event-driven program 100. The target event handler sequence through the event-driven program 100 may contain the e5 event handler 150, the e3 event handler 130, the e1 event handler 110, and other event handlers that may be identified to bring the target event handler sequence back to the beginning of the event-driven program 100.

During construction of various stages of a target event handler sequence, the event handlers that are not part of the target event handler sequence may be labeled as navigation or computation event handlers. Alternately or additionally, during the construction of various stages of the target event handler sequence some of the event handlers may be labeled as navigation event handlers for one or more stages of the construction of the target event handler sequence and as computation event handlers for one or more other stages of the construction of the target event handler sequence.

An event handler may be a computation event handler for one stage of construction of a target event handler sequence based on the event handler writing to a variable that is read by event handlers that are part of the target event handler sequence during the one stage of construction. An event handler that is not a computation event handler for one stage of construction of a target event handler sequence may be a navigation event handler for that stage of the construction.

For example, during a first stage of construction of a target event handler sequence starting at the end target 152, the target event handler sequence may contain the e5 event handler 150. The variables read in the target event handler sequence may be the first variable and the second variable. The first variable is written to during the e1 and e2 event handlers 110 and 120. The second variable is written to during the e4 event handler 140. Thus, the e1, e2, and e4 event handlers 110, 120, and 140 may be computation event handlers for the first stage of construction of the target event handler sequence. The e3 event handler 130 may not write to either the first variable or the second variable. Thus, the e3 event handler 130 may be a navigation event handler for the first stage of construction of the target event handler sequence.

In some embodiments, not every event handler writing to a variable that is read by event handlers that are part of the target event handler sequence during a stage of construction may be computation event handlers for the stage of construction. In these and other embodiments, the event handlers that write to the variables that affect an execution of a target within the event handlers of the target event handler sequence may be labeled as computation event handlers. For example, in FIG. 1, the first variable may affect the execution of the end target 152 within the e5 event handler 150 whereas the second variable may not affect the execution of the end target 152. Thus, even though the e4 event handler 140 writes to the second variable that is read in the e5 event handler 150 that contains the end target 152 and is part of the target event handler sequence, the e4 event handler 140 is not labeled a computation event handler. In this example, the e1 and e2 event handlers 110 and 120 may be labeled as computation event handlers for writing to the first variable that affects the execution of the end target 152.

After identifying computation and navigation event handlers for one stage of construction of a target event handler sequence, the computation event handlers may be pruned to determine the computation event handlers that may become part of the target event handler sequence. The computation event handlers that are pruned, referred to as the pruned computation event handlers, may be the non-eliminated computation event handlers and remain to become part of the target event handler sequence. The computation event handlers that are pruned away, referred to as the pruned away computation event handlers, may be eliminated computation event handlers, and may not become part of the target event handler sequence. To prune the computation event handlers, a condition associated with each of the variables read within the event handlers of the target event handler sequence may be determined. In some embodiments, one condition may be associated with one or more of the variables read within the event handlers of the target event handler sequence. In some embodiments, satisfying the condition may result in execution of the target. For example, in FIG. 1, the code portion 154 may contain a conditional "if" statement that relies on reading the value of the first variable to determine when the conditional "if" statement is satisfied.

After identifying the one or more conditions associated with each of the variables read within the event handlers of the target event handler sequence, the computation event handlers that write values to the variables that satisfy the conditions associated with each of the variables read are determined. The computation event handlers that do not write values to the variables that satisfy the conditions are pruned away, i.e. removed from consideration from being part of the one stage of the target event handler sequence being constructed. In some embodiments, the computation event handlers pruned away during one stage of construction of the target event handler sequence may not be pruned away during another stage of construction of the target event handler sequence. For example, as illustrated in FIG. 1, the e1 and e2 event handlers 110 and 120 may be labeled as computation event handlers. The e2 event handler 120 may be pruned away because the value 10 written to the first variable in the e2 event handler 120 may not satisfy the condition in code portion 154 of the e5 event handler 150. In contrast, the e1 event handler 110 may remain as part of the pruned computation event handlers because the value 5 is written to the first variable in the e1 event handler 110 and that value may satisfy the condition in code portion 154 of the e5 event handler 150 and result in the execution of the end target 152.

In some embodiments, a single pruned computation event handler results from pruning the computation event handlers. The target event handler sequence is then constructed from the target event handler closest to the beginning of the event-driven program 100 in the target event handler sequence (i.e.

the closest event handler) to the pruned computation event handler. In some embodiments, the closest event handler may be a target event handler. In some embodiments, the pruned computation event handler may be the next event handler in the target event handler sequence, in which case the construction of the one stage of the target event handler sequence may be completed. In some embodiments, various navigation event handlers may separate the closest event handler and the pruned computation event handler. In these and other embodiments, the navigation event handlers are inserted into the target event handler sequence between the closest event handler and the pruned computation event handler based on a navigation model of the event-driven program 100. For example, as illustrated in FIG. 1, the event handler 150 may be the closest event handler and the e1 event handler 110 may be the pruned computation event handler. The navigation e3 event handler 130 may separate the event handlers 110 and 150. In this example, the navigation e3 event handler 130 may be added in the target event handler sequence between the e1 and e5 event handlers 110 and 150 so that the target event handler sequence includes the e1, e3, and e5 event handlers 110, 130, and 150.

In some embodiments, multiple pruned computation event handlers result from pruning the computation event handlers. One of the multiple pruned computation event handlers may be selected for adding to the target event handler sequence. The one of the multiple pruned computation event handlers selected may be the pruned computation event handler that has navigation event handlers between itself and the closest event handler and no computation event handlers.

The target event handler sequence may continue to be constructed until the target event handler sequence flows through the event-driven program 100 from the beginning of the event-driven program 100 to the target event handler. During the construction of the target event handler sequence, multiple stages, e.g. multiple partial target event handler sequences, of the target event handler sequence may be constructed. During each stage of construction of the target event handler sequence, various aspects of constructing the target event handler sequence may occur, for example, determining computation and navigation event handlers for a target, pruning of the computation event handlers, selecting among the pruned computation event handlers, inserting navigation event handlers, among others.

By first identifying computation event handlers relevant to the target event handler sequence being constructed and/or current target and inserting navigation event handlers as needed, several event handlers or event handler sequences may be removed from consideration, for example those that may be constructed by considering all event handlers allowed by the navigation model. Further, by pruning the computation event handlers, a target event handler sequence may be more rapidly generated and/or may be generated using less processing resources than if the computation event handlers are not pruned. Alternately or additionally, by selecting event handlers as computation event handlers that affect a target, a target event handler sequence may be more rapidly generated and/or may be generated using less processing resources than if every event handler that writes to a variable read in event handlers in the target event handler sequence are designated as computation event handlers. Other advantages may also be obtained by constructing target event handler sequences as outlined above.

Modifications, additions, or omissions may be made to the event-driven program 100 and the aspects described above with respect to constructing a target event handler sequence without departing from the scope of the present disclosure.

For example, the event handlers 110, 120, 130, 140, and 150 may contain numerous other code elements, operations, or functions than those illustrated or discussed. For example, a variable may not contain a value such as a number, but the value may be a string or some other type of value that may be associated with a variable. Alternately or additionally, multiple other aspects for constructing target event handler sequences may be implemented in addition to the aspects discussed above to construct a target event handler sequence. For example, verification of each stage of the target event handler sequence may be performed. Alternately or additionally, verification of the entire target event handler sequence may be performed.

Figure 2:
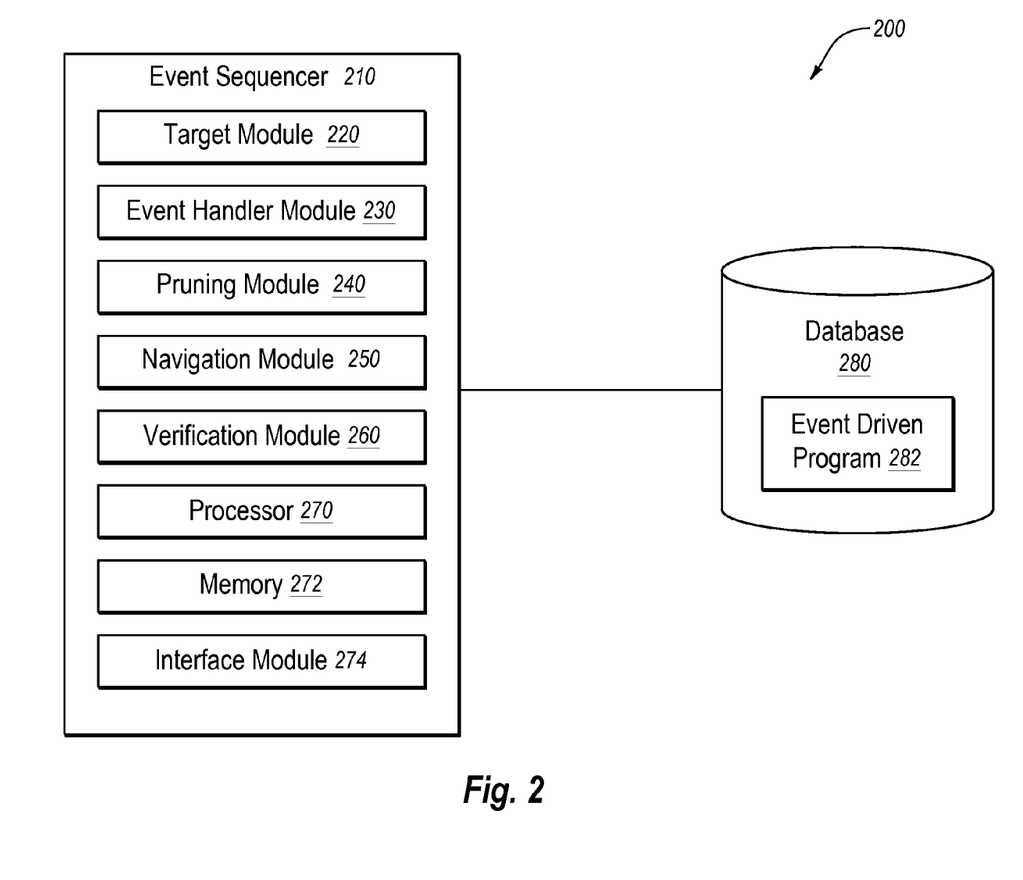
FIG. 2 illustrates an example constructing system for constructing a target event handler sequence from an end target in an event-driven program.

FIG. 2 illustrates an example system 200 for constructing a target event handler sequence from an end target in an event-driven program, arranged in accordance with at least some embodiments described herein. The system 200 may be used to construct target event handler sequences in event-driven programs, such as the event-driven program 100 of FIG. 1. In particular, the system 200 may construct target event handler sequences by determining computation event handlers for the target event handler sequence and pruning the computation event handlers.

The system 200 may include an event sequencer 210 that is communicatively coupled to a database 280. The event sequencer 210 may include, but is not limited to, a target module 220, an event handler module 230, a pruning module 240, a navigation module 250, a verification module 260, a processor 270, a memory 272, and an interface module 274. The event sequencer 210 may be configured so that the target module 220, the event handler module 230, the pruning module 240, the navigation module 250, the verification module 260, the processor 270, the memory 272, and the interface module 274 may communicate with each other and share information. The database 280 may include an event-driven program 282 for which the event sequencer 210 may determine target event handler sequences.

The event-driven program 282 may be any program in which a flow of the program is determined by events. For example, the event-driven program 282 may be a program that provides a GUI for an operating system or some other application or program. Alternately or additionally, the event-driven program 282 may be an application for a device, such as a smart phone, a tablet computer, a touch screen computer, a desktop computer, a laptop computer, a navigation system, a vehicle control system, or some other type of device.

The event sequencer 210 may be configured access the event-driven program 282 from the database 282 to allow the modules within the event sequencer 210 to use the event-driven program 282.

The target module 220 may be configured to identify a target in the event-driven program 282. The target may be a line of code, a branch statement, or some partial execution path, which may include one or more lines of code, one or more branch statements, and/or other operations and/or functions in the event-driven program 282.

In some embodiments, when first beginning to construct a target event handler sequence, the target may be referred to as an end target. In these and other embodiments, the end target may be randomly selected from a list of possible end targets within the event-driven program 282. In some embodiments, the end target may be identified based on a position of the end target within a list of possible end targets within the event-driven program 282. In some embodiments, the end target may be identified based on portions of the event-driven program 282 not tested by other test cases or other methods of testing the event-driven program 282. In some embodiments, the end target may be identified based on features of the event-driven program 282 that are particularly prone to having bugs. For example, an end target may be identified based on a suspected bug in the event-driven program 282 based on a static analysis of the event-driven program 282. As another example, an end target may be identified based on a portion of the event-driven program 282 not tested or covered by a regression test of the event-driven program 282.

In some embodiments, after having constructed a partial target event handler sequence, the target may be a line of code, a branch statement, or some partial execution path through one or more event handlers in the partial target event handler sequence. For example, the target may be a line of code that contains a variable that has a value written to it considered in constructing the partial target event handler sequence. Alternately or additionally, the target may be an execution path through the partial target event handler sequence that has been constructed. For example, the target may be one of multiple execution paths through a compilation of computational event handlers and navigational event handlers that form a partial target event handler sequence back to an end target that contains one or more variables that have values written thereto that may be considered when constructing the execution path in the partial target event handler sequence.

The event handler module 230 may be configured to determine a partial target event handler sequence that contains the target identified by the target module 220 when the target is a line of code or a branch statement in an event handler, or some partial execution path spanning one or more event handlers. Based on the determined partial target event handler sequence, the event handler module 230 may determine a set of variables read during the execution of one or more paths through the partial target event handler sequence that executes the target. The set of variables may be referred to as a read variable set. The event handler module 230 may also determine a set of event handlers that write to one or more of the variables in the read variable set. The event handlers that write to one or more of the variables in the read variable set may be labeled as computation event handlers. The event handlers that do not write to the one or more variables in the read variable set may be labeled as navigation event handlers. The event handler module 230 may determine the read variable set using concrete or static execution of the event-driven program 230 and/or using symbolic execution of the event-driven program.

In general, symbolic execution is a formal software verification technique that is derived from symbolic computation, which uses machines, such as computers, to manipulate mathematical equations and expressions in symbolic form. As applied here, symbolic execution may also be used to consider path traversal within programs and/or event handlers, to consider conditions for each path (i.e. values for variables that allow for a path to be traversed), to determine variables within each path, to determine operations and/or functions performed on variables in paths, to verify target event handler sequences, among other things.

In some embodiments, the event handler module 230 may be configured to determine variables read during a path within a partial target event handler sequence of the event-driven program 282 that may be the target. The event handler module 230 may determine variables read during the path that may be the target using symbolic execution. The variables read during the path that may be the target may be included in the read variable set. Variables read during paths within the partial target event handler sequence that do not result in the execution of the target may not be included in the read variable set.

In some embodiments, the event handler module 230 may be configured to determine variables read during each path within each of the event handlers of the event-driven program 282. The variables read during each path may be combined in a read variable set. Alternately or additionally, the event handler module 230 may be configured to determine variables written to during each path within each of the event handlers of the event-driven program 282. The variables written to during each path may be combined in a write variable set. In these and other embodiments, after receiving the target from the target module 220, the event handler module 230 may use the read variable sets and the write variable sets from the paths to determine computation event handlers and navigation event handlers as discussed above.

In some embodiments, the event handler module 230 may determine paths within event handlers and variables read and/or written to in each path within the event handlers using concrete, static, and/or symbolic execution of the event-driven program 230.

In some embodiments, the pruning module 240 may be configured to determine conditions associated with the variables read within the target. In particular, the pruning module 240 may determine path conditions that affect an execution of a target. The pruning module 240 may determine the conditions using symbolic execution.

The pruning module 240 may be further configured to prune the computation event handlers based on which of the computation event handlers may be configured to write a value to one or more of the variables read in the target that satisfies the condition(s) associated with one or more of the variables. In short, the pruning module 240 may prune away, that is eliminate, computation event handlers based on the computation event handlers writing values to the variables that are not within the target. The pruned computation event handlers (e.g. the non-eliminated computation event handlers) may be sorted through to form a target event handler sequence, a partial target event handler sequence, or be added to the already constructed partial target event handler sequence. The pruning module 240 may determine which of the computation event handlers to prune based on symbolic execution of the computation event handlers. Using symbolic execution, the pruning module 240 may know the values that may be written to the variables in the computation event handlers. Using symbolic execution, the pruning module 240 may also know the values for the variables that result in execution of the target. Using the values that may be written to the variables and the values for the variables that result in execution of the target, the pruning module 240 may prune the computation event handlers.

The navigation module 250 may be configured to determine which of the pruned computation event handlers may be linked to the target with none or one or more navigation event handlers and no intervening computation event handlers in a partial target event handler sequence from the target to or towards the beginning of the event-driven program 282.

To determine the pruned computation event handler that may be linked to the target, the navigation module 250 may treat each of the pruned computation event handlers individually. For a selected pruned computation event handler, the navigation module 250 may select none or one or more navigation event handlers that may link the target and the selected pruned computation event handler. The navigation module 250 may select the navigation event handlers based on a navigation model of the event-driven program 282.

The navigation model of the event-driven program 282 may be constructed before or during the constructing of the target event handler sequence through the event-driven program 282. The navigation model may be constructed by dynamically and/or statically crawling the event-driven program 282 and constructing a map of the event-driven program 282 that shows links between the event handlers within the event-driven program 282. Using the map of the event-driven program 282, the navigation module 250 may determine which if any of the navigation event handlers may link the target and the selected pruned computation event handler.

After determining the navigation event handlers that link the selected pruned computation event handler and the target, the navigation module 250 may verify that the navigation event handlers, the target, and the selected pruned computation event handler form a proper partial target event handler sequence within the event-driven program 282. The navigation module 250 may verify that a proper partial target event handler sequence is formed using symbolic execution to follow the path formed by the navigation event handlers, the target, and the selected pruned computation event handler. When the navigation module 250 does not verify that a proper target event handler sequence is formed, the navigation module 250 may select another pruned computation event handler and follow the same process outlined above. In some embodiments, the navigation module 250 may not be able to determine navigation event handlers to link the selected pruned computation event handler and the target or may not be able to determine navigation event handlers to link the selected pruned computation event handler and the target without intervening computation event handlers. In these and other embodiments, the navigation module 250 may select another pruned computation event handler and follow the same process outlined above.

The verification module 260 may be configured to determine when a target event handler sequence constructed by the navigation module 250 includes the beginning of the event-driven program 282. When the target event handler sequence constructed by the navigation module 250 does include the beginning of the event-driven program 282, the event sequencer 210 may have formed a complete target event handler sequence. When the target event handler sequence constructed by the navigation module 250 does not include the beginning of the event-driven program 282, the event sequencer 210 may have formed a partial target event handler sequence and may continue to construct the complete target event handler sequence as described herein.

The processor 270 may be configured to execute computer instructions that cause the event sequencer 210 to perform the functions and operations described herein. The computer instructions may be loaded into the memory 272 for execution by the processor 270 and/or data generated, received, or operated on during performance of the functions and operations described herein may be at least temporarily stored in the memory 272.

The interface module 274 may be configured to receive data from and/or to send data to other systems, users, and/or other processes over any type of communications network. In some embodiments, the interface module 274 may be configured to receive information concerning an end target to identify a starting event handler for the target event handler sequence or other information. In some embodiments, the interface module 274 may be configured to receive the event-driven program 282 and to store the event-driven program 282 in the database 280 and/or the memory 260.

Figure 3A:
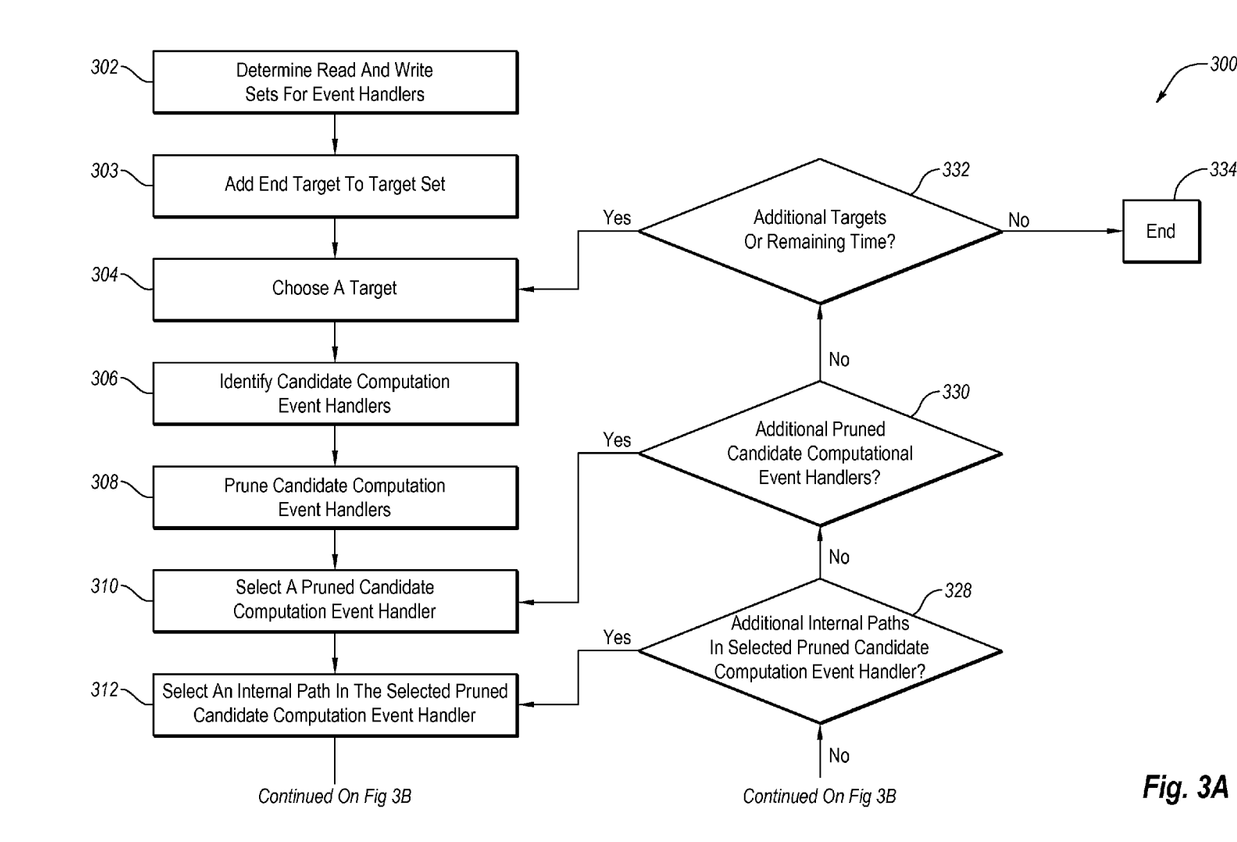
FIGS. 3A and 3B illustrate a flow chart of an example method of constructing target event handler sequences from an end target in an event-driven program.
Figure 3B:
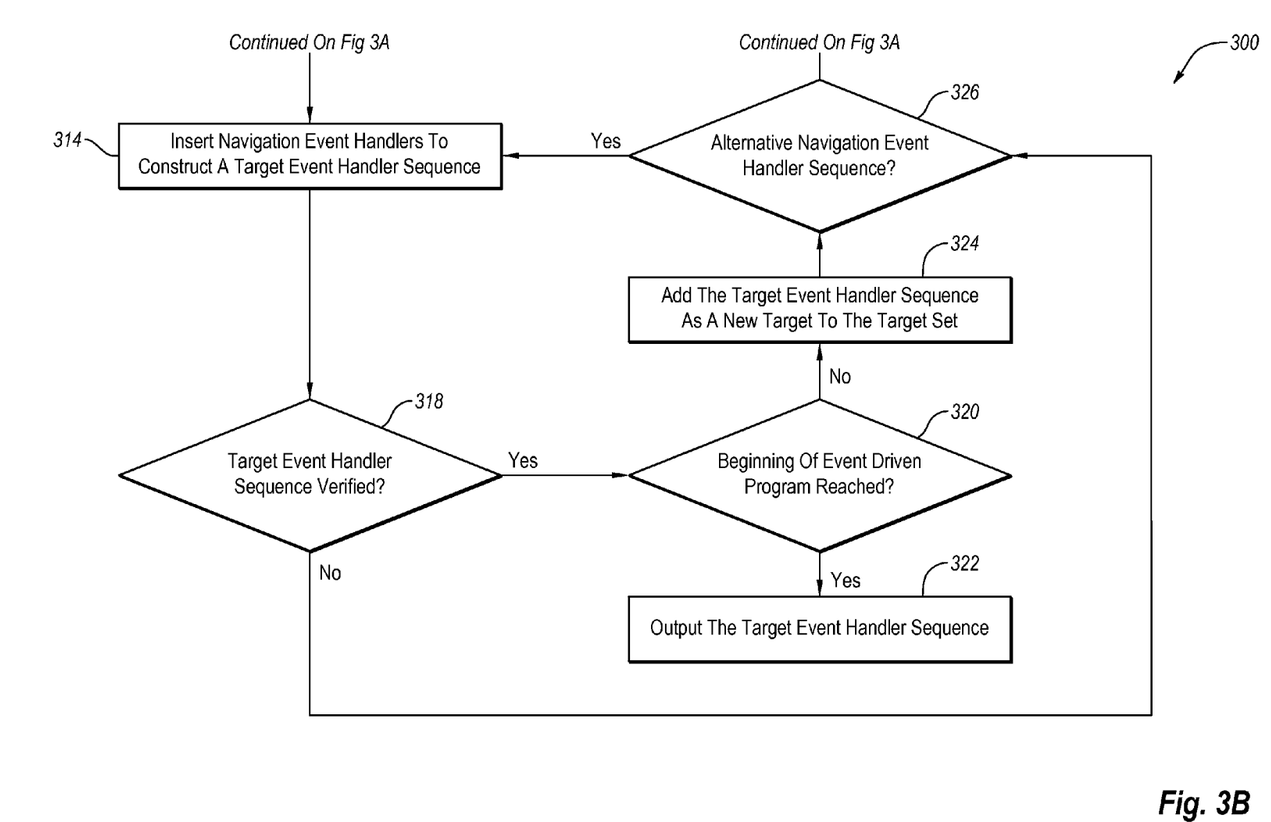

FIGS. 3A and 3B illustrate a flow chart of an example method 300 of constructing target event handler sequences from an end target in an event-driven program, arranged in accordance with at least some embodiments described herein. The method 300 may be implemented, in some embodiments, by a constructing system, such as the system 200 for constructing a target event handler sequence from an end target in an event-driven program of FIG. 2. For instance, the processor 270 of the system 200 of FIG. 2 may be configured to execute computer instructions to perform operations for constructing a target event handler sequence from an end target in an event-driven program as represented by one or more of the blocks of the method 300. Although illustrated as discrete blocks, various blocks may be divided into additional blocks, combined into fewer blocks, or eliminated, depending on the desired implementation.

The method 300 may begin at block 302, where read and write sets for event handlers may be determined. An event-driven program may have been previously selected that contains multiple event handlers. Paths within each of the event handlers may be determined. Using the path information, a read set may be formed from variables read within each of the paths of each of the event handlers. Additionally, a write set may be formed from variables written to within each of the paths of each of the event handlers. Thus, for each event handler, read and write sets may be determined for each of the paths of the event handler.

In block 303, an end target is added to a target set. The end target may be a first target in a target event sequence and may be used to determine a starting event handler for the target event handler sequence being constructed using the method 300. The target set may contain the end target until additional targets are identified as described herein.

In block 304, a target may be chosen. The first target determined may be the end target. This may be used to determine a starting event handler for the target event handler sequence being constructed using the method 300. Other than the first target determined, the other targets may be targets in event handlers other than the starting event handler or in partial target event handler sequences. For example, when the method 300 returns to block 304 from block 332 (described in more detail below) a path through a partial target event handler sequence may have been constructed and be the target.

In block 306, candidate computation event handlers may be identified. The candidate computation event handlers may be identified based on the read and write sets and the chosen target. In particular, the candidate computation event handlers may be identified based on the candidate computation event handlers writing to variables that are read in a target.

In block 308, the candidate computation event handlers may be pruned. The candidate computation event handlers may be pruned based on the candidate computation event handlers writing a value to the variables read in the target that allows a condition associated with the variables read in the target to be satisfied. In particular, the candidate computation event handlers may be pruned based on the candidate computation event handlers writing a value to the variables read in the target that satisfies a path condition for execution of the target.

In block 310, a pruned candidate computation event handler may be selected. The pruned computation event handler may be randomly selected or may be selected based on other criteria. For example, in some embodiments, the pruned computation event handler may be selected based on a navigational model of the event-driven program. In these and other embodiments, the pruned computation event handler closest to the target based on the navigational model may be selected.

In block 312, an internal path in the selected pruned candidate computation event handler may be selected. The selected pruned candidate computation event handler may include various internal paths based on the conditions within the elected pruned candidate computation event handler. For example, a selected pruned candidate computation event handler may include five code statements. During one internal path, the selected pruned candidate computation event handler may traverse two of the code statements and during another of the internal paths, the selected pruned candidate computation event handler may traverse another two of the code statements.

In block 314, one or more navigation event handlers may be inserted to construct a target event handler sequence that executes the internal path selected in block 312 and the target chosen in block 304. The target event handler sequence constructed may be between the target and the selected pruned computation event handler. For example, the target event handler sequence may be between a target event handler and the selected pruned computation event handler. The navigation event handlers may be selected for insertion based on a navigational model of the event-driven program.

In block 318, the target event handler sequence may be verified. Verifying the target event handler sequence may include determining that the constructed target event handler sequence and the path through the target event handler sequence is a valid target event handler sequence and valid path through the target event handler sequence within the event-driven program. In some embodiments, verifying the target event handler sequence and the path through the target event handler sequence may include determining that the path through the target event handler sequence provides for a continuous non-disjointed path between the target and the selected pruned computation event handler. In some embodiments, verifying the target event handler sequence may include determining that the target event handler sequence and the path through the target event handler sequence provides for a continuous non-disjointed path between the end target and the selected internal path in the selected pruned computation event handler. A verified target event handler sequence may be consistent with the navigation flow of the event-driven program and thus an event sequence that may be traversed in the event-driven program. The target event handler sequence may be verified using concrete, static, or symbolic execution. When the target event handler sequence is not verified, the method 300 may proceed to block 326. When the target event handler sequence is verified, the method 300 may proceed to block 320.

In block 320, it may be determined if a beginning of the event-driven program has been reached. The beginning of the event-driven program may be reached when the constructed target event handler sequence includes the beginning of the event-driven program. When the beginning of the event-driven program has been reached, the method 300 may proceed to block 322. When the beginning of the event-driven program has not been reached, the verified target event handler sequence is a partial target event handler sequence and the method 300 may proceed to block 324.

In block 322, the target event handler sequence may be output and the method 300 may end.

In block 324, the target set may be adjusted. To adjust the target set, one or more of the targets within the target set may be removed. In particular, the target for which the partial target event handler sequence is constructed may be removed. Alternately or additionally, adjusting the target set may include adding one or more targets to the target set. In particular, the partial target event handler sequence may be added to the target set as a new target.

In block 326, it may be determined if alternative navigation event handler sequences are available to construct a target event handler sequence or a partial target event handler sequence that executes the internal path selected in block 312 and the target chosen in block 304. When an alternately navigational event handler sequence that includes one or more navigational event handlers is available, the method 300 may proceed to block 314 and another target event handler sequence may be constructed in block 314 and other portions of the method 300 may be repeated as illustrated in FIGS. 3A and 3B. When no alternatively navigational event handler sequences are available, the method 300 may proceed to block 328.

In block 328, it may be determined if there are additional internal paths in the selected pruned computational event handler. When there are additional internal paths in the selected pruned computational event handler, the method 300 may proceed back to block 312 where another internal path in the selected pruned computational event handler may be selected and the method 300 may continue. When there are no additional internal paths in the selected pruned computational event handler, the method 300 may proceed to block 330.

In block 330, it may be determined if there are additional pruned computational event handler. When there are additional pruned computational event handler, the method 300 may proceed back to block 310 where another pruned computational event handler may be selected and the method 300 may continue. When there are no additional pruned computational event handlers, the method 300 may proceed to block 332.

In block 332, it may be determined if there are additional targets within the target set and/or if there is time remaining to construct the target event handler sequence. When there are additional targets in the target set and time remaining, the method 300 may proceed back to block 304 where another target may be selected and the method 300 may continue. When there are no additional targets and/or no time remaining, the method 300 may proceed to block 334. The amount of time allowed for constructing the target event handler sequence may vary. In some embodiments, the time allowed may be predetermined, calculated based on a user input, dependent on resource usage to perform the method 300, based on or determined using various other factors.

In block 334, the method 300 may end. In some embodiments, in block 334 a message may be presented indicating that a target event handler sequence could not be determined and/or what the time allocated for constructing the target event handler sequence has expired.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4A:
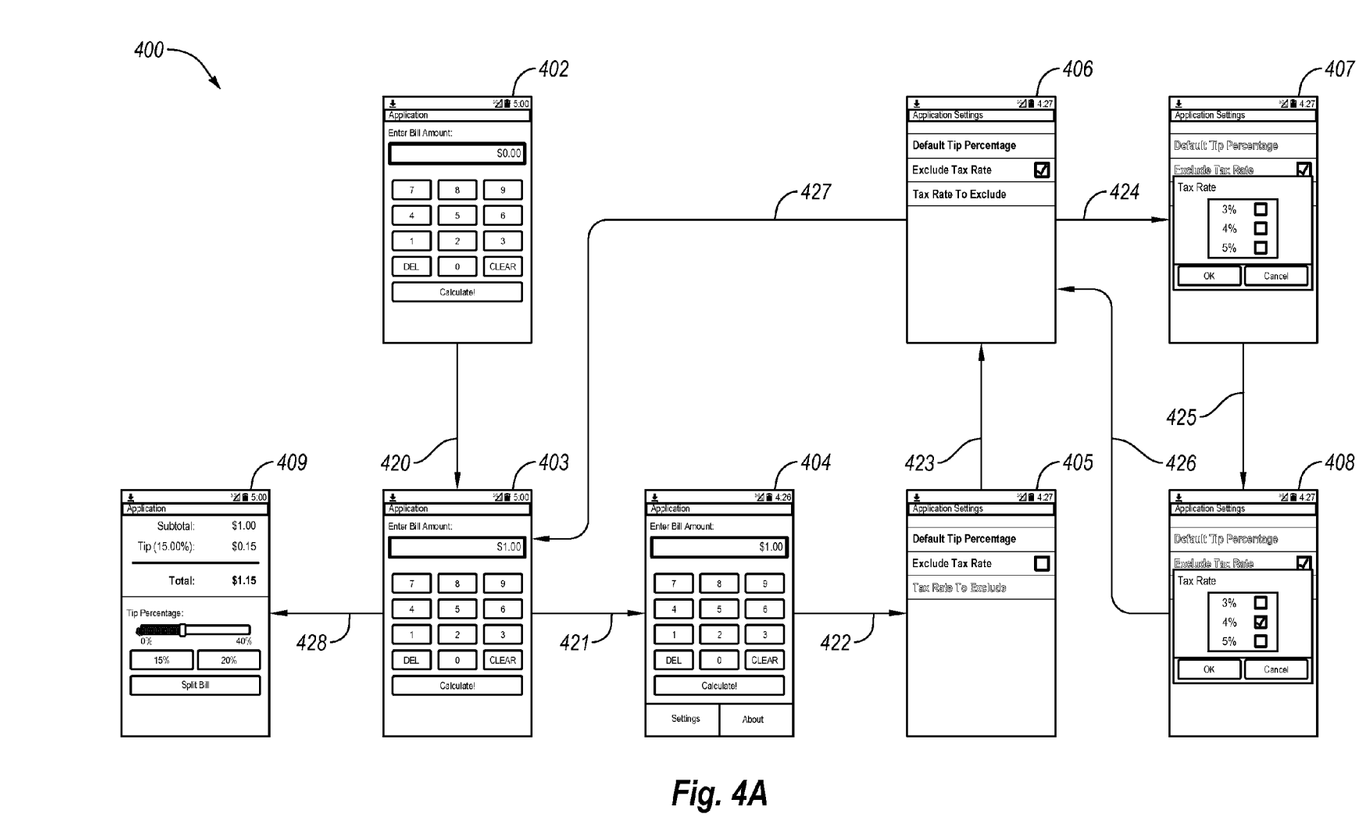
FIG. 4A illustrates example event screens of an event-driven program.

FIG. 4A illustrates example event screens of an event-driven program 400, arranged in accordance with at least some embodiments described herein. The event-driven program 400 may be a program that may be used to determine a tip for a bill. The event-driven program 400 may have various screens that change based on events that occur within the event-driven program 400. In particular, FIG. 4A illustrates screens 402-409 and events 420-428. Each of the events 420-428 may be associated with an event handler. The screen 402 may be an initial screen and the beginning of the event-driven program 400. An example target event handler sequence using the events 420-428 is now described proceeding from the beginning of the event-driven program 400 to the event 428. After describing the target event handler sequence using the events 420-428, constructing the target event handler sequence using the method 300 is described where the target event handler sequence is constructed from the event 428 to the beginning of the event-driven program 400.

The event-driven program 400 begins at screen 402. An event 420 where a user enters 1.00 for the amount may cause the event-driven program 400 to proceed to screen 403. An event 421, where a user pushes a menu button, may cause the event-driven program 400 to proceed to screen 404. An event 422, where a user pushes the settings button, may cause the event-driven program 400 to proceed to screen 405. An event 423, where a user checks the "exclude tax rate" box, may cause the event-driven program 400 to proceed to screen 406. An event 424, where a user selects the "tax rate to exclude" button, may cause the event-driven program 400 to proceed to screen 407. An event 425, where a user selects the "4%" as a tax rate, may cause the event-driven program 400 to proceed to screen 408. An event 426, where a user selects the "ok" button, may cause the event-driven program 400 to proceed to screen 406. An event 427, where a user selects a "back" button, may cause the event-driven program 400 to proceed to screen 403. An event 428, where a user selects the "calculate" button, may cause the event-driven program 400 to proceed to screen 409.

Figure 4B:
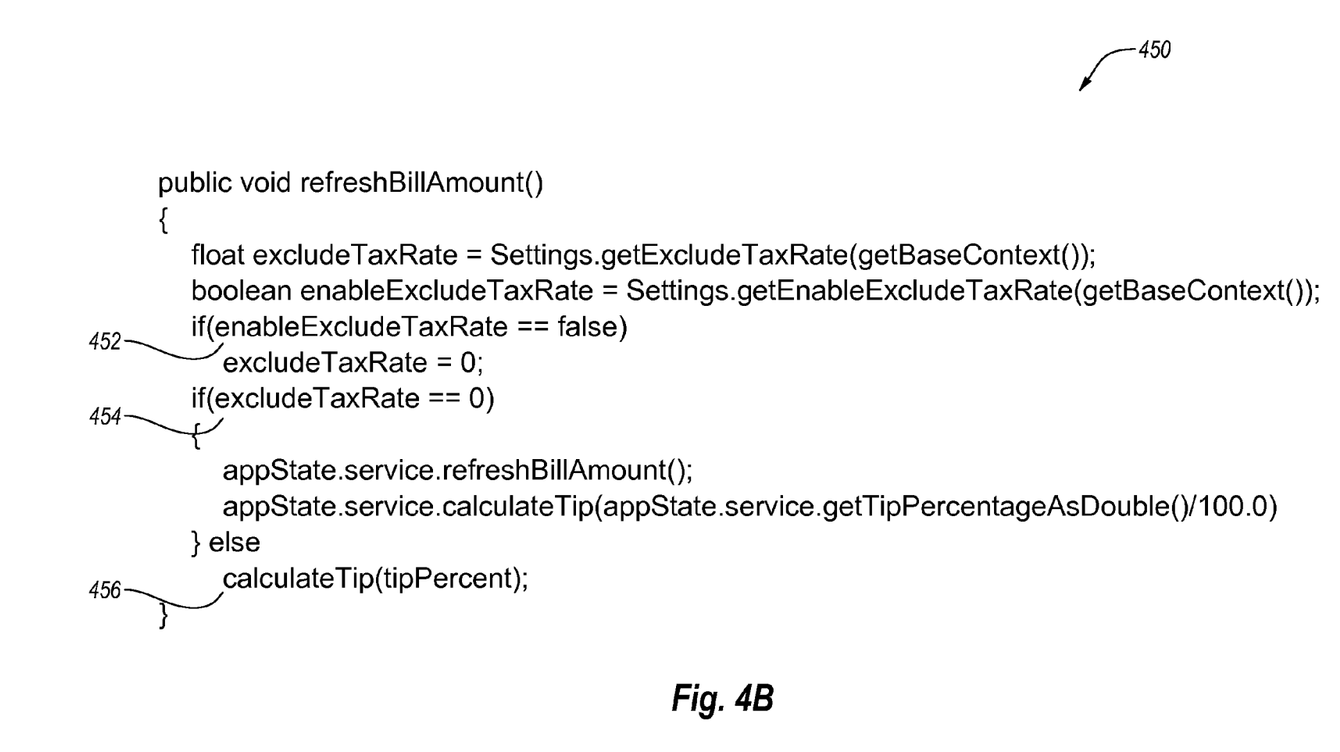
FIG. 4B illustrates an example event handler within the event-driven program of FIG. 4A.

FIG. 4B illustrates an example event handler 450 within the event-driven program of FIG. 4A, arranged in accordance with at least some embodiments described herein. In particular, the event handler 450 may handle the event 428 in FIG. 4A. The event handler 450 may include various variables, such as enableExcludeTaxRate 452 and excludeTaxRate 454. In particular, the event-handler 450 may read the variables enableExcludeTaxRate 452 and excludeTaxRate 454

With combined reference to FIGS. 3, 4A, and 4B, an example of the method 300 follows. In block 302, read and write sets may be determined for event handlers of event-driven program 400. A read set for the event handler 450 may include the variables enableExcludeTaxRate 452 and excludeTaxRate 454. Note that three other event handlers, a first event handler associated with the event 423, a second event handler associated with the event 425, and a third event handler associated with the initialization of the event-driven program 400 have write sets. In particular, the first event handler has a write set that includes the variable enableExcludeTaxRate 452 and has a path that sets the variable enableExcludeTaxRate 452 to true. The second event handler has a write set that includes the variable excludeTaxRate 454 and has a path that sets the variable excludeTaxRate 454 to 3, 4, or 5. The third event handler has a write set that includes both the enableExcludeTaxRate 452 and the excludeTaxRate 454 variables and a path that sets the enableExcludeTaxRate 452 to false and the excludeTaxRate 454 to 0.

In block 303, an end target is added to a target set. The end target is a line of code 456 as illustrated in FIG. 4B. Because the event handler 450 includes the end target, the event handler 450 is the first event handler in the sequence being constructed. Additionally, at the current iteration, the event handler 450 is the target event handler.

In block 304, the end target is chosen from the target set as the target for this iteration of the method 300. In block 306, the candidate computation event handlers are identified. With the target being the line of code 456, the event handlers that write to the variables enableExcludeTaxRate 452 and excludeTaxRate 454 are the candidate computation event handlers. In this example, the candidate computation event handlers may be the first, second, and third event handlers. The event handlers associated with the remaining events, the events 427, 426, 424, 422, 421, and 420 are navigation event handlers.

In block 308, the candidate computation event handlers are pruned. The condition associated with the variable enableExcludeTaxRate 452 to be satisfied is that the variable enableExcludeTaxRate 452 be true to allow for execution of the target. The condition associated with the variable excludeTaxRate 454 to be satisfied is that the variable excludeTaxRate 454 be not equal to zero to allow for execution of the target. Pruning the candidate computation event handlers based on satisfying the conditions removes the third event handler from the candidate computation event handlers because the third event handler writes the variables enableExcludeTaxRate 452 to be false and the excludeTaxRate 454 to be zero.

In block 310, the first event handler may be selected as the pruned candidate computational event handler. In block 312, an internal path in the first event handler may be selected. In block 314, navigation event handlers may be selected that include event handlers associated with events 427, 426, and 424 that are navigation events that occur between the event 428 associated with the target event handler and the event 423 associated with the selected pruned computation event handler, i.e. the first event handler. A target event handler sequence may be generated that includes the event handlers associated with the events 428, 427, 426, 424, and 423.

In block 316, the target event handler sequence determined in block 312 is not verified because it includes a disjointed path. The path is disjointed because the target event handler sequence skips the event handler associated with the event 425, i.e. the second event handler, which is a computation event handler. In block 326, no additional navigational event handler sequences are identified and no additional internal paths are identified in block 328. In block 330, there are additional pruned candidate computational event handlers, so the method 300 proceeds back to block 310.

In block 310, the second event handler may be selected. In block 312, an internal path in the second event handler may be selected. In block 314, navigation event handlers may be selected that include event handlers associated with events 427 and 426, which are navigation events, that occur between the event 428 associated with the target event handler and the event 425 associated with the selected pruned computation event handler, i.e. the second event handler. A target event handler sequence may be generated that includes the event handlers associated with the events 428, 427, 426, and 425.

In block 318, the target event handler sequence generated by block 314 may be verified. In block 320, it may be determined that the beginning of the event-driven program 400 is not reached so that the method 300 proceeds to block 324. In block 324, the target event handler sequence generated by the block 314, which is a partial target event handler sequence, may be added to the target set. The target from event handler 450 may be removed from the target set since a partial target event handler sequence has been generated for the target. The method 300 then proceeds through blocks 326, 328, and 330 to block 332.

In block 332, there is time remaining and a target in the target set, so the method 300 proceeds to block 304.

In block 304, a target is identified. The target may be the previously constructed partial target event handler sequence that includes the second event handler sequence, the event handler 450, along with other navigational event sequences as described herein. In block 306, the candidate computation event handlers are identified. With the target being the previously constructed partial target event handler sequence, the variables read within previously constructed partial target event handler sequence that are not written to in the previously constructed partial target event handler sequence includes the variable enableExcludeTaxRate 452. The event handlers that write to the variable enableExcludeTaxRate 452 are the candidate computation event handlers or the first and third event handlers. The event handlers associated with the remaining events not within the target event handler sequence, the events 424, 422, 421, and 420, are navigation event handlers.

In block 308, the candidate computation event handlers are pruned. The condition associated with the variable enableExcludeTaxRate 452 to be satisfied is that the variable enableExcludeTaxRate 452 be true to allow for execution of the target. Pruning the candidate computation event handlers based on satisfying the conditions removes the third event handler from the candidate computation event handlers.

In block 310, the first event handler may be selected. In block 312, an internal path within the first event handler that results in the execution of the previously constructed partial target event handler sequence is selected. In block 314, one or more navigation events handlers may be selected that include an event handler associated with the event 424 that is a navigation event that occurs between the previously constructed partial target event handler sequence and the event 423 associated with the selected pruned computation event handler, i.e. the first event handler. A target event handler sequence may be generated that includes the navigational event handlers associated with the events 425, 424, and 423 and appended to the previously constructed partial target event handler sequence that included the event handlers associated with the events 428, 427, 426, and 425 so that the target event handler sequence now contains the event handlers associated with the events 428, 427, 426, 425, 424, and 423.

In block 318, the target event handler sequence generated by block 314 may be verified. In block 320, it may be determined that the beginning of the event-driven program 400 is not reached so that the method 300 proceeds to block 324. In block 320, the target event sequence constructed in block 314 is added to the target set as a new target and the previously constructed partial target event handler sequence is removed from the target set. Steps 326, 328, 330, 332, 304, 306, 308, 310, 312, 314, 318, and 320 of the method 300 may be repeated. During step 314 the remaining navigation event handlers may be appended to the previously constructed partial target event handler sequence that includes event handlers associated with the events 428, 427, 426, 425, 424, and 423, namely the event handlers associated with the events 420, 421, and 422 to complete the target event handler sequence.

Figure 5:
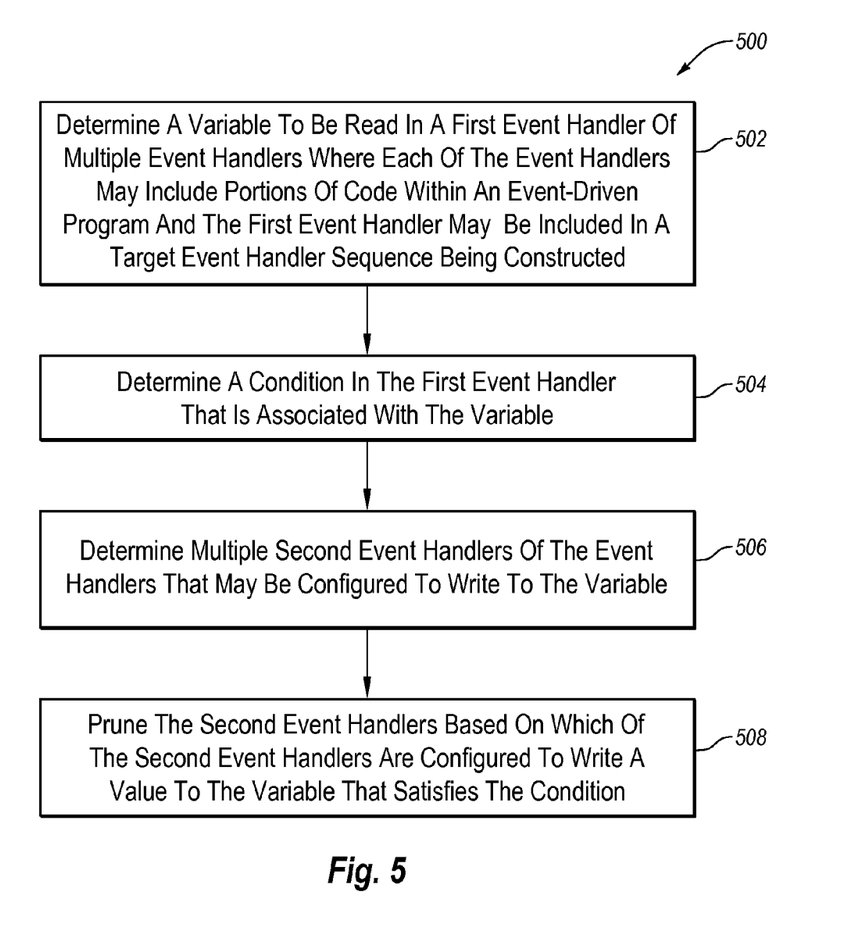
FIG. 5 is a flow chart of another example method of constructing a target event handler sequence from an end target in an event-driven program.

FIG. 5 is a flow chart of an example method 500 of constructing target event handler sequences from an end target in an event-driven program, arranged in accordance with at least some embodiments described herein. The method 500 may be implemented, in some embodiments, by a constructing system, such as the system 200 for constructing a target event handler sequence from an end target in an event-driven program of FIG. 2. For instance, the processor 270 of the system 200 of FIG. 2 may be configured to execute computer instructions to perform operations for constructing a target event handler sequence from an end target in an event-driven program as represented by one or more of blocks 502, 504, 506, and/or 508 of the method 500. Although illustrated as discrete blocks, various blocks may be divided into additional blocks, combined into fewer blocks, or eliminated, depending on the desired implementation.

The method 500 may begin at block 502, where a variable to be read in a first event handler of multiple event handlers is determined. Each of the event handlers may include portions of code within an event-driven program and the first event handler may be included in a target event handler sequence being constructed. In some embodiments, determining the variable may include pruning multiple variables that include the variable based on which of the variables are to be read to execute a target in the first event handler. In these and other embodiments, pruning the variables may include determining which of the variables are to be read to execute the target based on symbolic execution of the first event handler.

In block 504, a condition in the first event handler that is associated with the variable may be determined. In some embodiments, the condition in the first event handler may affect an execution of the target within the first event handler.

In block 506, multiple second event handlers of the event handlers may be determined. The second event handlers may be configured to write to the variable.

In block 508, the second event handlers may be pruned based on which of the second event handlers are configured to write a value to the variable that satisfies the condition. In some embodiments, pruning the second event handlers may include determining which of the second event handlers are configured to write a value to the variable that satisfies the condition based on symbolic execution of the second event handlers.

In some embodiments, the method 500 may further include identifying an end target in the event-driven program. The end target may be included in the first event handler when the first event handler is an ending location for the event-sequence being constructed and the target event handler sequence is traversed from a beginning of the event-driven program.

In some embodiments, the method 500 may also include constructing at least a partial target event handler sequence using the first event handler and one or more of the pruned second event handlers. In these and other embodiments, constructing at least the partial target event handler sequence may include inserting one or more navigation event handlers between the first event handler and the one of the pruned second event handlers.

Figure 6:
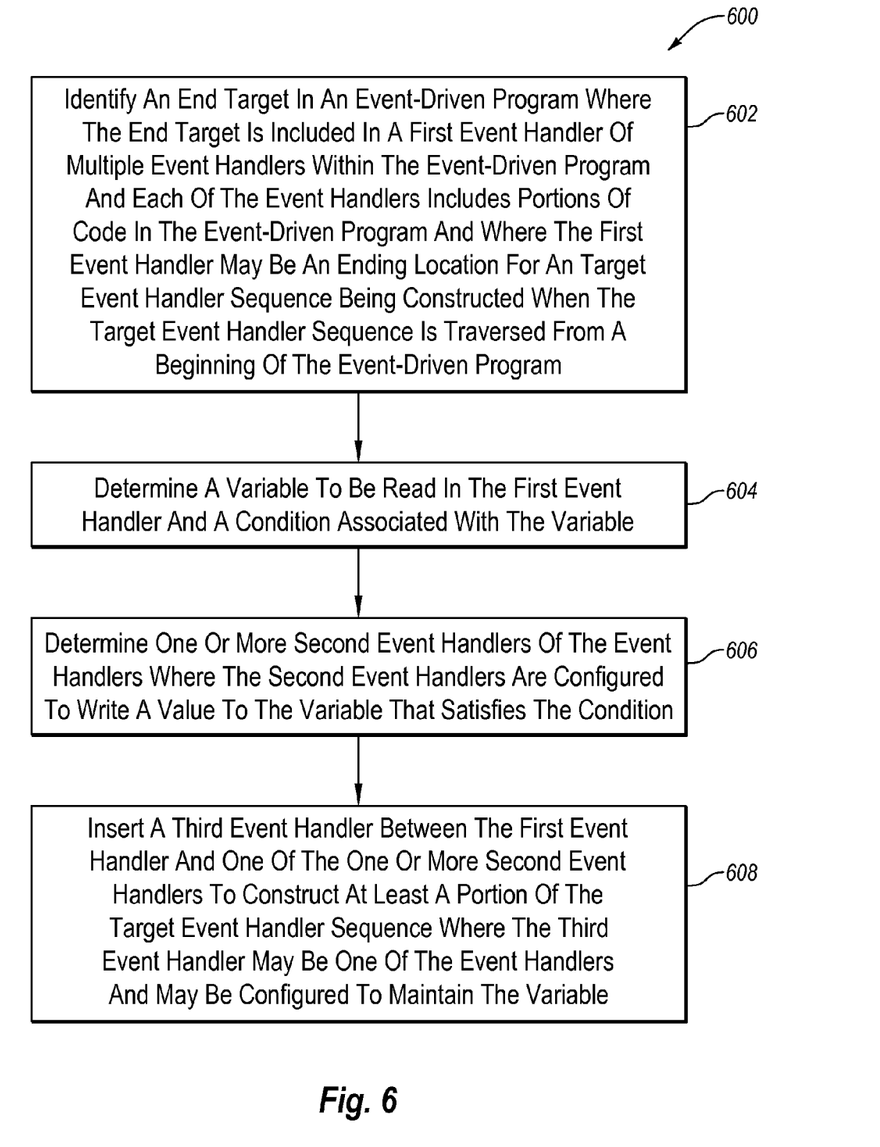
FIG. 6 is a flow chart of another example method of constructing a target event handler sequence from an end target in an event-driven program.

FIG. 6 is a flow chart of an example method 600 of constructing target event handler sequences from an end target in an event-driven program, arranged in accordance with at least some embodiments described herein. The method 600 may be implemented, in some embodiments, by a constructing system, such as the system 200 for constructing a target event handler sequence from an end target in an event-driven program of FIG. 2. For instance, the processor 270 of the system 200 of FIG. 2 may be configured to execute computer instructions to perform operations for constructing a target event handler sequence from an end target in an event-driven program as represented by one or more of blocks 602, 604, 606, and/or 608 of the method 600. Although illustrated as discrete blocks, various blocks may be divided into additional blocks, combined into fewer blocks, or eliminated, depending on the desired implementation.

The method 600 may begin at block 602, where an end target in an event-driven program may be identified. The end target may be included in a first event handler of multiple event handlers within the event-driven program where each of the event handlers includes portions of code in the event-driven program. The first event handler may be an ending location for an event-sequence being constructed when the target event handler sequence is traversed from a beginning of the event-driven program.

In block 604, a variable to be read in the first event handler and a condition associated with the variable may be determined.

In block 606, one or more second event handlers of the event handlers may be determined where the second event handlers are configured to write a value to the variable that satisfies the condition.

In block 608, a third event handler may be inserted between the first event handler and one of the one or more second event handlers to construct at least a partial target event handler sequence. The third event handler may be one of the event handlers and may be configured to maintain the variable.

In some embodiments, the method 600 may further include verifying the partial target event handler sequence using symbolic execution. When the partial target event handler sequence is unverified, the method 600 may also include inserting a fourth event handler between another of the one or more second event handlers and the first event handler to construct the partial target event handler sequence. When the partial target event handler sequence is verified and the partial target event handler sequence does not include the beginning of the event-driven program, the method 600 may further include various steps. For example, the method 600 may include determining a second variable to be read in the one of the one or more second event handlers and a second condition associated with the second variable.

The method 600 may also include determining one or more third event handlers of the event handlers. The third event handlers may be configured to write a second value to the second variable that satisfies the second condition. The method 600 may further include inserting a fourth navigation event handler between the one of the one or more second event handlers and one of the third event handlers to construct at least a second partial target event handler sequence.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the disclosure.

What is claimed is:

1. A method of constructing a target event handler sequence from an end target in an event-driven program, the method being implemented by hardware configured to execute instructions stored on a non-transitory computer-readable media, the method comprising:
   determining a variable to be read in a first event handler of a plurality of event handlers, each of the plurality of event handlers comprising portions of code within an event-driven program and the first event handler being included in a target event handler sequence being constructed;
   determining a condition in the first event handler that is associated with the variable;
   determining a plurality of second event handlers of the plurality of event handlers, the plurality of second event handlers configured to write to the variable; and
   pruning the plurality of second event handlers based on which of the plurality of second event handlers are configured to write a value to the variable that satisfies the condition.

2. The method of claim 1, wherein the pruning the plurality of second event handlers comprises determining which of the plurality of second event handlers are configured to write a value to the variable that satisfies the condition based on symbolic execution of the plurality of second event handlers.

3. The method of claim 1, further comprising identifying an end target in the event-driven program, the end target included in the first event handler when the first event handler is an ending location for the target event handler sequence being constructed and the target event handler sequence is traversed from a beginning of the event-driven program.

4. The method of claim 1, wherein the determining the variable comprises pruning a plurality of variables that include the variable based on which of the plurality of variables are to be read to execute a target in the first event handler.

5. The method of claim 4, wherein the pruning the plurality of variables comprises determining which of the plurality of variables are to be read to execute the target based on symbolic execution of the first event handler.

6. The method of claim 1, wherein the condition in the first event handler affects an execution of a target within the first event handler.

7. The method of claim 1, further comprising constructing at least a portion of the target event handler sequence using the first event handler and one or more of the pruned second event handlers.

8. The method of claim 7, wherein the constructing at least the portion of the target event handler sequence comprises inserting one or more navigation event handlers between the first event handler and the one or more of the pruned second event handlers.

9. A processor configured to execute computer instructions to cause a system to perform operations for constructing a target event handler sequence from an end target in an event-driven program, the operations comprising:
  determining a variable to be read in a first event handler of a plurality of event handlers, each of the plurality of event handlers comprising portions of code within an event-driven program and the first event handler being included in a target event handler sequence being constructed;
  determining a condition in the first event handler that is associated with the variable;
  determining a plurality of second event handlers of the plurality of event handlers, the plurality of second event handlers configured to write to the variable; and
  pruning the plurality of second event handlers based on which of the plurality of second event handlers are configured to write a value to the variable that satisfies the condition.

10. The processor of claim 9, wherein the pruning the plurality of second event handlers comprises determining which of the plurality of second event handlers are configured to write a value to the variable that satisfies the condition based on symbolic execution of the plurality of second event handlers.

11. The processor of claim 9, wherein the operations further comprise identifying an end target in the event-driven program, the end target included in the first event handler when the first event handler is an ending location for the target event handler sequence being constructed when the target event handler sequence is traversed from a beginning of the event-driven program.

12. The processor of claim 9, wherein the determining the variable comprises pruning a plurality of variables that include the variable based on which of the plurality of variables are to be read to execute a target in the first event handler.

13. The processor of claim 12, wherein the pruning the plurality of variables comprising determining which of the plurality of variables are to be read to execute the target based on symbolic execution of the first event handler.

14. The processor of claim 9, wherein the condition in the first event handler affects an execution of a target within the first event handler.

15. The processor of claim 9, wherein the operations further comprise constructing at least a portion of the target event handler sequence using the first event handler and one or more of the pruned second event handlers.

16. The processor of claim 15, wherein the constructing at least the portion of the target event handler sequence comprises inserting one or more navigation events between the first event handler and the one or more of the pruned second event handlers.

17. A method of constructing a target event handler sequence from an end target in an event-driven program, the method being implemented by hardware configured to execute instructions stored on a non-transitory computer-readable media, the method comprising:
  identifying an end target in an event-driven program, the end target included in a first event handler of a plurality of event handlers, each of the plurality of event handlers comprising portions of code in the event-driven program and the first event handler being an ending location for a target event handler sequence being constructed when the target event handler sequence is traversed from a beginning of the event-driven program;
  determining a variable to be read in the first event handler and a condition associated with the variable;
  determining one or more second event handlers of the plurality of event handlers, the one or more second event handlers configured to write a value to the variable that satisfies the condition; and
  inserting a third event handler between the first event handler and one of the one or more second event handlers to construct at least a portion of the target event handler sequence, the third event handler being one of the plurality of event handlers and being configured to maintain the variable.

18. The method of claim 17, further comprising verifying the portion of the target event handler sequence using symbolic execution.

19. The method of claim 18, wherein when the portion of the target event handler sequence is unverified, the method further comprises inserting a fourth event handler between another of the one or more second event handlers and the first event handler to construct the portion of the target event handler sequence.

20. The method of claim 18, wherein when the portion of the target event handler sequence is verified and the portion of the target event handler sequence does not include the beginning of the event-driven program, the method further comprises:
  determining a second variable to be read in the one of the one or more second event handlers and a second condition associated with the second variable;
  determining one or more fourth event handlers of the plurality of event handlers that are configured to write a second value to the second variable that satisfies the second condition; and
  inserting a fifth navigation event handler between the one of the one or more second event handlers and one of the one or more fourth event handlers to construct at least a second portion of the target event handler sequence.

* * * * *